United States Patent [19]

Melcher

[11] Patent Number: 4,931,779
[45] Date of Patent: Jun. 5, 1990

[54] SIMPLIFIED AUDIBLE MISFEED ALARM FOR DOCUMENT COUNTER

[75] Inventor: Richard A. Melcher, Croydon, Pa.

[73] Assignee: Brandt, Inc., Bensalem, Pa.

[21] Appl. No.: 334,476

[22] Filed: Apr. 7, 1989

Related U.S. Application Data

[62] Division of Ser. No. 182,482, Apr. 15, 1988.

[51] Int. Cl.$^5$ .............................................. G08B 21/00
[52] U.S. Cl. .................................... 340/674; 340/686; 377/8
[58] Field of Search .................... 377/8; 340/674, 675, 340/686

[56] References Cited

U.S. PATENT DOCUMENTS

| | | | |
|---|---|---|---|
| 3,870,868 | 3/1975 | Jones | 377/8 |
| 4,268,746 | 5/1981 | Schroeder | 340/674 |
| 4,406,996 | 9/1983 | Oka | 340/674 |
| 4,665,392 | 5/1987 | Koontz | 340/674 |
| 4,707,843 | 11/1987 | McDonald | 377/8 |

*Primary Examiner*—John S. Heyman
*Attorney, Agent, or Firm*—Shenier & O'Connor

[57] ABSTRACT

An improved audible alarm system for a document counter having an internal oscillator for producing a binary coded output in response to count signals applied to the counter in response to sheets moving along a path in which the counter internal oscillator is coupled to an audible alarm in response to a misfeed.

5 Claims, 1 Drawing Sheet

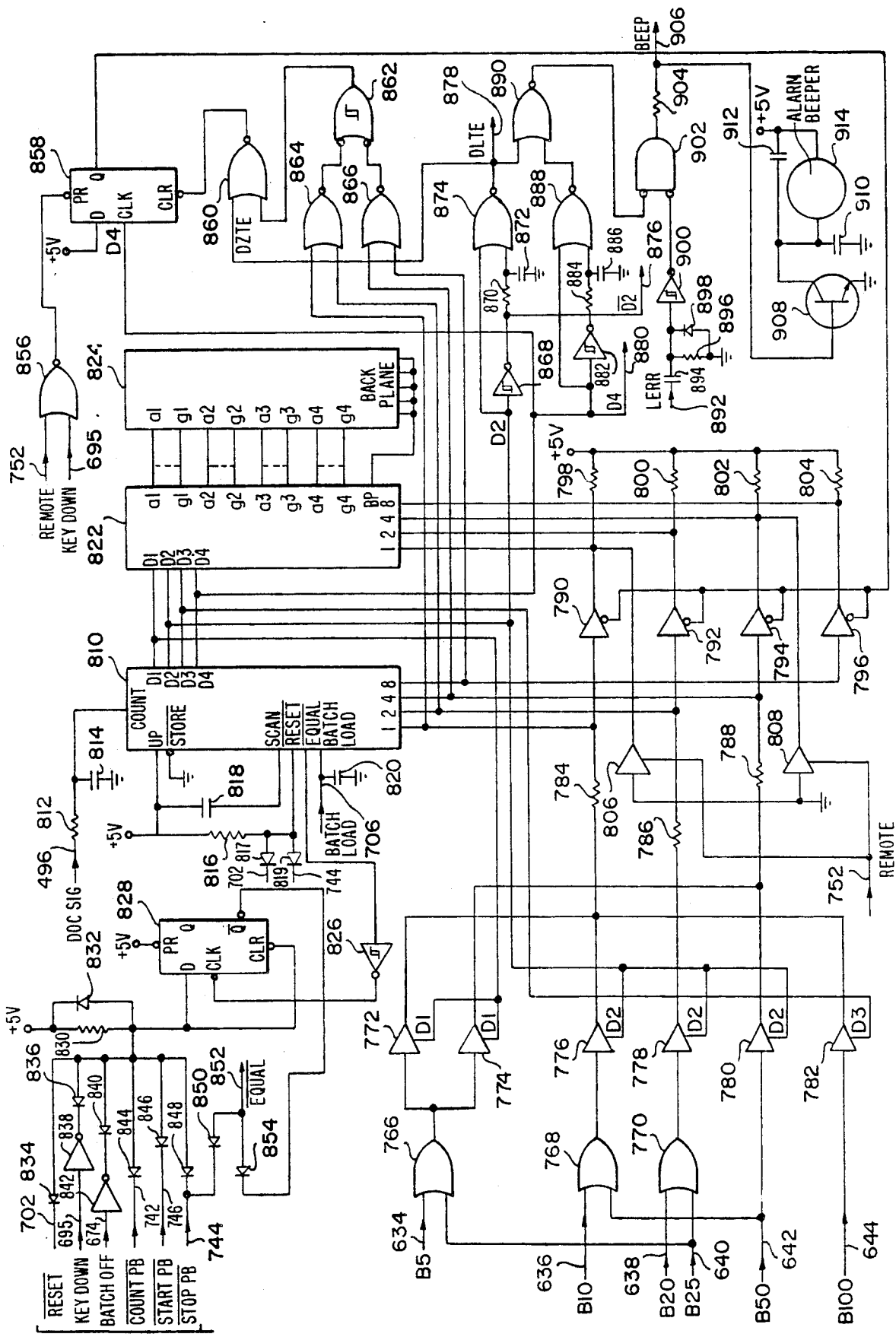

SIMPLIFIED AUDIBLE MISFEED ALARM FOR DOCUMENT COUNTER

"This is a divisional of co-pending application Ser. No. 07/182,482 filed on Apr. 15, 1988."

FIELD OF THE INVENTION

This invention relates to a document counter provided with a simplified audible misfeed alarm.

BACKGROUND OF THE INVENTION

Various forms of document counters are known in the prior art in which the passage of documents along a feed path increments a counter which actuates a visible display to indicate the number of documents which have been counted. Most of these document counters of the prior art are provided with some form of alarm, either visual or audible for indicating to the operator that a misfeed has occurred.

My invention contemplates apparatus in which the internal oscillator of a counter which is incremented in response to the movement of a sheet along a path is coupled to an audible alarm in response to the detection of a misfeed. Preferably the counter is a four-digit programmable up/down counter whose count is used for both batch control and digital display. By using the internal oscillator of an existing component in this manner, I avoid the necessity of providing a separate oscillator for the audible alarm.

BRIEF DESCRIPTION OF THE DRAWINGS

In the accompanying drawings to which reference is made in the instant specification and which are to be read in conjunction therewith and in which like reference characters are used to indicate like parts in the various views:

The Figure is a schematic diagram of a portion of the control circuit of a document counter showing my simplified audible misfeed alarm arrangement.

DESCRIPTION OF THE PREFERRED EMBODIMENT

The details of the mechanical arrangement of a document feeder which may be provided with my simplified audible misfeed alarm and the details of much of the control circuitry therefore are shown and described in the co-pending application Ser. No. 182,482 filed Apr. 15, 1989, now patent no. which is incorporated herein by reference.

Referring now to the drawings and as is described in the co-pending application, the document feeder control circuit provides RESET, KEY DOWN, BATCH OFF, COUNT SPACE PB, START PB, and STOP PB signals on respective conductors 702, 695, 674, 742, 746 and 744. In addition, B5, B10, B20, B25, B50 and B100 signals, indicating various batch sizes, are provided on conductors 634, 636, 638, 640, 642 and 644. A REMOTE signal is generated on a line 752 while a KEY DOWN signal is on a conductor 695.

Referring to the drawing, a first OR gate 766 responsive to signals from B5 line 634 and B25 line 640 drives a pair of buffers 772 and 774 which receive enable inputs from a D1 line to be described. A second OR gate 768 responsive to the B10 signal on line 636 and the B50 signal on line 642 drives a single buffer 776 receiving an enable input from a D2 line to be described. A third OR gate 770 responsive to B20 line 638 and to B25 line 640 drives a buffer 778 also responsive to the D2 enable signal. Finally, B50 line 642 and B100 line 644 directly drive buffers 780 and 782 controlled by respective enable signals D2 and D3. Buffers 772, 776 and 782 have their outputs coupled through a resistor 784 to a buffer 790. In a similar manner, respective resistors 786 and 788 couple the respective outputs of buffers 778 and 780 to buffers 792 and 794. Buffers 790 to 794, together with a buffer 796, have their outputs coupled to the 5-volt line through respective resistors 798 to 804. Buffers 790 and 794 also have their outputs strapped to the outputs of respective buffers 806 and 808, the inputs of which are grounded and the enable terminals of which are coupled to REMOTE line 752 (FIG. 10).

The inputs to buffers 790 to 794 are also applied to the 1, 2 and 4 inputs, respectively, of a four-digit LED display programmable up/down counter 810, which may be an Intersil ICM7217 or equivalent. Counter 810 has its COUNT input coupled to ground through a capacitor 814 and to a DOCSIG line 496 through a resistor 812. Counter 810 has its UP input coupled to the 5-volt line directly, its RESET input coupled to the 5-volt line through a resistor 816 and through isolating diodes 817 and 819 to low-level signals on lines 702 and 744, and its SCAN input coupled to the 5-volt supply through a capacitance 818 of about 1 picofarad. A line 706 supplies a BATCH LOAD signal to a capacitor 820 coupled to the BATCH LOAD input of counter 810. The D1 to D4 outputs of counter 810 drive the corresponding inputs of a display driver 822, which may be an Intersil ICM7211A. Display driver 822 receives its 1, 2, 4 and 8 bit inputs from buffers 790 to 796, respectively. The segmental outputs a1-g1, a2-g2, a3-g3 and a4-g4 of driver 822 drive the corresponding inputs of a four-digit segmental liquid crystal display (LCD) 824. Driver 822 also has its BP output coupled to the BACKPLANE inputs of display 824.

A Schmitt trigger inverter 826 couples the EQUAL output of counter 810 to the CLK input of a D-type flip-flop 828, the PR input of which is coupled to the 5-volt supply. Flip-flop 828 has its D and CLR inputs coupled to the anode of a diode 832, the cathode of which is coupled to the 5-volt supply. A resistor 830 provides a parallel path across diode 832. A diode 834 couples a low-level RESET signal on line 702 to the D input of flip-flop 828. The same flip-flop input is also responsive to the low-level output of an inverter 838, the input of which is coupled to KEYDOWN line 695 and the output of which is coupled to the flip-flop through a diode 836. A diode 840 has its anode coupled to the D input of flip-flop 828 and its cathode to the output of inverter 842, the input of which is derived from BATCHOFF line 674. Respective diodes 844, 846 and 848 provide the same flip-flop input with low-level signals from lines 742, 746 and 744, respectively. Respective diodes 850 and 854 supply EQUAL line 852 with low-level signals from line 744 and the Q output of flip-flop 828, respectively.

A NOR gate 856 responsive to REMOTE line 752 and KEYDOWN line 695 controls the PR input of a D-type flip-flop 858, the D input of which is coupled to the 5-volt line and the CLK input of which receives the D4 output from counter 810. Flip-flop 858 has its Q output coupled to inhibit inputs to buffers 790 to 796. The CLR input of flip-flop 858 receives a signal from a NOR gate 860, one input of which is derived from a Schmitt trigger NAND gate 862. Gate 862 in turn receives inputs from NOR gates 864 and 866. Gate 864 has its inputs coupled to the inputs to inverters 790 and 792, while gate 866 has its inputs coupled to the inputs to inverters 794 and 796.

In the alarm pulse generating portion of the display circuit 576, a Schmitt trigger inverter 868 responsive to the D2 signal from counter 810 is coupled through a resistor 870 to a capacitor 872 also coupled to one input of a NOR gate 874. In addition to driving gate 874, inverter 868 provides a $\overline{D2}$ signal on line 876. The other input of gate 874 is derived directly from the D2 line from counter 810. NOR gate 874 provides a D2TE signal on a line 878 coincident with the trailing edge of the signal D2. This signal is applied to the other input to NOR gate 860 as well as to one input of another NOR gate 890. NOR gate 890 receives its other input from a NOR gate 888, one input of which is coupled directly to the D4 line from counter D10. The latter counter output also appears on line 880. A Schmitt trigger inverter 882 responsive to the D4 signal is coupled through a resistor 884 to a capacitor 886 coupled to the other input to NOR gate 888.

NOR gate 890 drives one input of a NOR gate 902, the other input of which is derived from a Schmitt trigger inverter 900 coupled through a capacitor 894 to a LERR line 892 carrying a latched error signal. Inverter 900 also has its input coupled to the cathode of a diode 898, the anode of which is grounded. A resistor 896 provides a parallel path between the inverter input and ground. A resistor 904 couples the output of NOR gate 902 to a line 906 which carries a BEEP signal for possible use elsewhere in the apparatus 20. The BEEP signal drives the base of an NPN transistor 908, the emitter of which is grounded. An alarm beeper or electronic buzzer 914, which may be a Star QMB-06 or equivalent having a resonant frequency of approximately 2048 Hz, is coupled between the collector of transistor 908 and the 5-volt supply. A capacitor 912 provides a parallel path across beeper 914, while a capacitor 910 provides such a path between the collector of transistor 908 and ground.

Circuit elements 766 to 788 supply the binary-coded decimal (BCD) inputs 1, 2, 4 and 8 of counter 810 with appropriate signals representing the selected batch size in synchronism with the strobe pulses generated by counter 810 on lines D1 to D4. For example, if a batch count of 25 (=025) is selected, the first, or least significant, digit 5 of the count has a BCD representation of 0101, while the second digit 2 has a BCD representation of 0010 and the third digit has a BCD representation of 0000. Accordingly, the appearance of a first-digit signal D1 at the enabling inputs of circuits 772 and 774 produces high-level signals at the 1 and 4 inputs to counter 810. Similarly, the appearance of a second-digit signal D2 at the enabling input of circuit 778 results in the appearance of a high-level signal at the 2 input to counter 810. These signals are loaded into counter 810 in response to the BATCH LOAD signal produced on line 706 in response to the actuation of a batch selection key.

If the user initiates a count mode of operation, a high level output appears on KEYDOWN line 695. In this mode of operation, however, no batch count is loaded into counter 810, and the counter 810 is simply used to count the sheets 38 passing photodiode 204. This count, however, is supplied to display driver 822, and hence display 824, by way of drivers 790 to 796, which supply the BCD signals 1, 2, 4 and 8 to driver 822 from counter 810. Counter 810 supplies the BCD equivalent of a particular digit in accordance with the particular digit signal D1, D2, D3 or D4 that is currently at a high level. Counter 810 also supplies these digit signals directly to driver 822 to insure that the BCD inputs are strobed into the driver 822 at the proper time.

Counter 810 maintains a count of the sheets as indicated by the DOCSIG signal on line 496. When the document count equals the desired batch count loaded into counter 810, counter 810 supplies a low-level EQUAL signal to inverter 826, which thereupon supplies a positive-going pulse to the CLK input of flip-flop 828. If, as is normally the case, the D input of flip-flop 828 is high at this time, flip-flop 828 will change state to provide a low-level EQUAL signal on line 852. This signal on line 852 is used to disable the mechanical drive. Since the portion of the electromechanical control circuit responsive to line 852 is conventional, and forms no part of the present invention, it has been omitted from the description for the purposes of simplicity.

Counter 810 produces periodic pulse trains on lines D1 to D4 at a frequency controlled by capacitance 818. This capacitance, which approximates 1 pF, may be realized either by a discrete element or, if desired, by utilizing the stray capacitance of the printed circuit board containing counter 810. Thus, the required capacitance may be achieved by disposing a matrix of lines under the chip making up counter 810 and using the dielectric constant of the printer circuit board and the solder mask layer to isolate it to give the required capacitance. NOR gate 890 supplies gate 902 with relatively short (e.g., 0.1 millisecond) pulses coincident with the trailing edges of the D2 and D4 signals. Capacitor 894 and resistor 896 at the input to inverter 900 have a time constant of about 0.5 second so that transistor 908 supplies beeper 914 with a pulse train approximating this duration. Capacitance 818 reduces the frequency of pulses D1 to D4 to a value low enough (about 525 Hz, or about one-quarter the resonant frequency of beeper 914) to allow beeper 914 to be excited with a ringing type of signal as described, without being unduly sensitive to the particular instant of excitation.

Counter 810, which generates signals on line D1 to D4 in the sequence D4-D3-D2-D1, sets display flip-flop 858 at the beginning of each D4 pulse and resets the flip-flop through NOR gate 860 at the end of each D2 pulse or sooner if any of the BCD inputs to gates 864 and 866 are high. Flip-flop 858, whenever it is reset, effectively removes buffers 790 to 794 from the BCD inputs to display driver 822, allowing the inputs to be pulled high through resistors 798 to 804. As a result, display 824 blanks the first two leading zeros of the count, while displaying the two least significant digits even if they are zero.

It will be seen that I have accomplished the object of my invention. I have provided a simplified audible misfeed alarm for a document counter which does away with the necessity of providing a separate oscillator for the audible alarm.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus including in combination means for advancing sheets along a path, a counter having an internal oscillator for producing a binary coded output in response to count signals applied to said counter, means responsive to the movement of sheets along said path for applying count signals to said counter an audible alarm, and means responsive to the misfeed of a sheet along said path for coupling said oscillator to said alarm.

2. Apparatus as in claim 1 including means for displaying the count stored in said counter.

3. Apparatus as in claim 1 in which said alarm has a predetermined self-oscillation frequency, said internal oscillator having a frequency substantially below said self-oscillation frequency.

4. Apparatus including in combination means for advancing sheets along a path, a display driver having an internal counter and oscillator for producing a binary coded output in response to count signals applied to said counter, means responsive to the movement of sheets along said path for applying count signals to said counter, an audible alarm, and means responsive to the misfeed of a sheet along said path for coupling said oscillator to said alarm.

5. Apparatus as in claim 4 in which said driver is an LED display driver.

* * * * *